UNITED STATES PATENT OFFICE.

WILLIAM JONES MENZIES, OF ST. HELEN'S, COUNTY OF LANCASTER, ENGLAND.

COMPOSITION FOR THE MANUFACTURE OF SOAP.

SPECIFICATION forming part of Letters Patent No. 345,714, dated July 20, 1886.

Application filed May 21, 1886. Serial No. 202,894. (No specimens.)

*To all whom it may concern:*

Be it known that I, WILLIAM JONES MENZIES, a British subject, residing at St. Helen's, in the county of Lancaster, England, have invented certain new and useful Improvements in Compositions for the Manufacture of Soap; and I hereby declare the following to be a full and exact description of the same.

The object of the invention is to produce a composition of caustic potash and caustic soda in form of dry powder suitable for making soap and similar uses.

In Reissued Patents, dated May 9, 1882, Nos. 10,108, and 10,109 is described the method and apparatus for grinding and sieving caustic alkalies, so as to obtain them in dry granulated or powdered condition. While caustic alkalies can be so ground, I have discovered that caustic potash of high test is so hygroscopic that it cannot be successfully ground by itself, and that it can only be ground in connection with soda. A mixture of these alkalies—to wit, caustic potash and caustic soda—is not only very desirable, but very useful and necessary in order to obtain the best results in soap-making. To produce this compound, the fused cake of potash and soda may be made separately and then ground together, or the potash and soda may be fused together in suitable proportions, the potash being from five to twenty-five per cent. of the mass, and then ground.

By grinding the potash and soda together by the method substantially as described in the above-mentioned patents I obtain a new and valuable compound in a dry powdered or granulated condition, and one that is free from deliquescence, and in a condition that it may be put up in packages in the most convenient form suitable for use in domestic and other soap-making, either by the cold or other processes.

What I claim as my invention, and desire to secure by Letters Patent, is—

1. A compound for soap-making, consisting of granulated or powdered caustic potash and caustic soda in proper proportions, combined during the process of grinding, substantially as set forth.

2. A compound for soap-making, consisting of caustic potash and caustic soda produced by first fusing together the caustic potash and caustic soda in the proper proportions and then reducing said compound to a granulated or powdered condition by grinding.

In witness whereof I have hereunto set my hand.

WILLIAM JONES MENZIES.

Witnesses:
O. B. MORRIS,
GEORGE H. SONNEBORN.